(12) United States Patent
Haag et al.

(10) Patent No.: US 6,236,309 B1
(45) Date of Patent: May 22, 2001

(54) HORN SWITCH ASSEMBLY FOR AN AIRBAG MODULE

(75) Inventors: Ronald Helmut Haag, Clarkston; Hafiz S Khafagy, Rochester, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/396,295

(22) Filed: Sep. 15, 1999

(51) Int. Cl.⁷ ........................................................ B60Q 1/00
(52) U.S. Cl. .................. 340/438; 340/449; 340/384.6; 307/9.1; 307/10.1; 280/728.1; 280/731
(58) Field of Search ........................... 340/438, 449, 340/384.6, 384.7; 307/9.1, 10.1, 116, 651, 152; 280/728.1, 728.2, 731, 735

(56) References Cited

U.S. PATENT DOCUMENTS

| | | | |
|---|---|---|---|
| 4,973,859 | * 11/1990 | Shodai | 307/10.1 |
| 5,265,905 | * 11/1993 | Shelton | 280/731 |
| 5,280,946 | * 1/1994 | Adams et al. | 280/728 B |
| 5,306,040 | * 4/1994 | Leonelli et al. | 280/728 B |
| 5,398,962 | * 3/1995 | Kropp | 280/731 |
| 5,489,806 | * 2/1996 | Harris et al. | 307/10.1 |
| 5,965,952 | * 8/1998 | Podoloff | 307/10.1 |

* cited by examiner

Primary Examiner—Jeff Hofsass
Assistant Examiner—Daniel Previl
(74) Attorney, Agent, or Firm—Kathryn A. Marra

(57) ABSTRACT

A horn switch assembly (26) is mounted on inner surface (28) of airbag cover (16). Horn switch assembly (26) includes a sensor (30) coupled to cover (16), and a load and rate sensing device (32) arranged to interact with sensor (30) and with a vehicle horn. Deflection of outer surface (18) of airbag cover (16) applies a force to sensor (30). Deflection of outer surface (18) of airbag cover (16) may be caused by an operator action of pressing on airbag cover (16). In which case, the increase in the magnitude of the force on sensor (30) will be rapid, and load and rate sensing device (32) will cause the vehicle horn to sound. Alternatively, deflection of outer surface (18) of airbag cover (16) may be caused by shrinkage of airbag cover (16) due to an ambient temperature drop. In which case, the increase in the magnitude of the force on sensor (30) will be slow, and load and rate sensing device (32) will not cause the horn to sound.

8 Claims, 2 Drawing Sheets

HORN SWITCH ASSEMBLY FOR AN AIRBAG MODULE

TECHNICAL FIELD

The present invention relates to a horn switch assembly. In particular, the invention relates to a horn switch assembly for use in an airbag module.

BACKGROUND OF THE INVENTION

Modern motor vehicles are supplied with driver's side airbag modules. Airbag modules are most commonly mounted in the center of the steering wheel, the location where a horn-activating switch has traditionally been mounted. When driver's side airbags were first introduced, the horn-activating switch was moved from the center to another location on the steering wheel to make room for the airbag. The horn-activating switches were often mounted on the steering wheel spokes or rim. However, many drivers preferred the traditional placement of the horn-activating switch.

Eventually, the horn-activating switch was adapted for mounting on the underside of the airbag module cover, allowing the horn-activating switch to be placed in its traditional position. Such horn-activating switches are pressure sensitive switches that detect when the user is applying force to the cover in effort to sound the horn. However, placing the pressure sensitive switches beneath the horn cover subjects the switch to the expansion and contraction (shrinkage) of the cover. As the temperature within the vehicle decreases, the airbag module cover shrinks, causing a force to be applied to the pressure sensitive switch. This force may increase to the level required to sound the horn, resulting in an unexpected sounding of the horn. In addition, changes in the stiffness of the cover due to changes in temperature can cause a variation in the pressure required to activate the horn.

U.S. Pat. No. 5,489,806 describes an airbag horn switch with temperature compensation. A temperature sensitive device, such as a thermistor, is attached to the airbag cover along with the pressure sensitive horn switch. The change in characteristics of the temperature sensor is used to compensate for temperature variations by adjusting the magnitude of the force required to activate the horn. However, the use of two sensors, a temperature sensor and a pressure sensor, increases the complexity and cost of the circuit.

SUMMARY OF THE INVENTION

In an exemplary embodiment of the invention, a horn switch assembly for a steering wheel of a motor vehicle comprises a sensor arranged to sense a force applied to a steering wheel cover. The sensor generates a signal indicative of the magnitude of the force. A load and rate sensing device receives the signal and determines a rate of increase of the magnitude. The load and rate sensing device generates a horn activation signal when the magnitude exceeds a first threshold value and the rate of increase exceeds a second threshold value.

BRIEF DESCRIPTION OF THE DRAWINGS

The present invention will now be described, by way of example only, with reference to the accompanying drawings in which.

DESCRIPTION OF AN EMBODIMENT OF THE INVENTION

Figure 1:
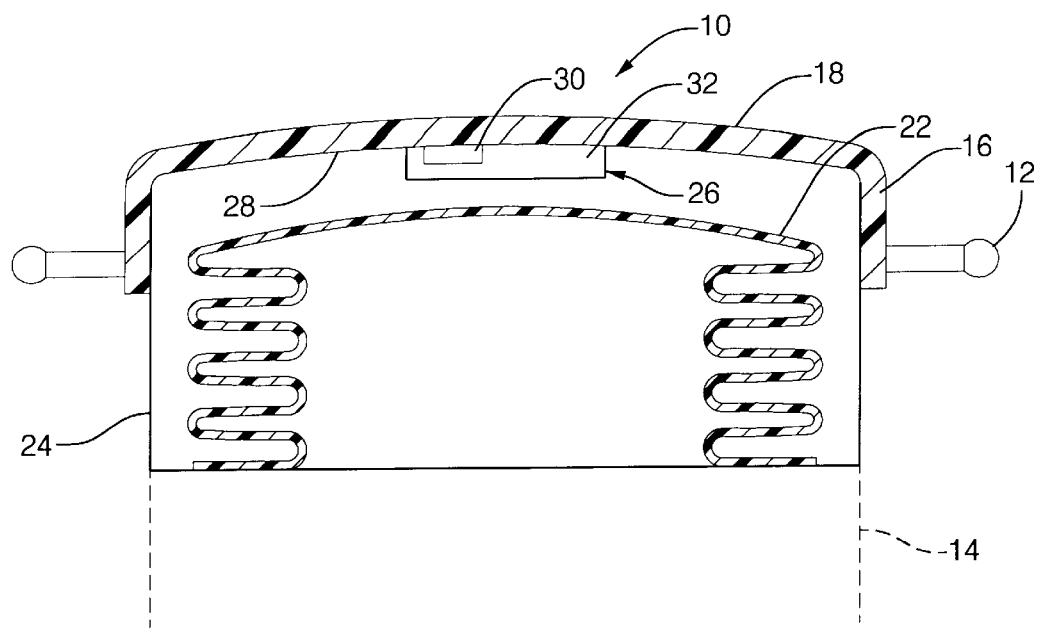
FIG. 1 is a cross-sectional view of a steering wheel mounted airbag module including a horn switch assembly of the present invention.

Referring to FIG. 1, a motor vehicle airbag module, shown generally as 10, is centered in a steering wheel 12 and mounted on a steering column 14. Airbag module 10 includes an airbag cover 16 having an outer surface 18 and an inner surface 28. An airbag 22 mounted within an airbag housing 24 is shown for reference.

A horn switch assembly 26 is mounted on inner surface 28 of airbag cover 16. Horn switch assembly 26 includes a sensor 30 coupled to cover 16, and a load and rate sensing device 32 arranged to interact with sensor 30 and with a vehicle horn (not shown). Deflection of outer surface 18 of airbag cover 16 applies a force to sensor 30. Deflection of outer surface 18 of airbag cover 16 may be caused by an operator action of pressing on airbag cover 16. In which case, load and rate sensing device 32 will cause the vehicle horn to sound. Alternatively, deflection of outer surface 18 of airbag cover 16 may be caused by shrinkage of airbag cover 16 due to an ambient temperature drop. In which case, load and rate sensing device 32 will not cause the horn to sound. Horn switch assembly 26 is described in further detail hereinafter.

Figure 2:
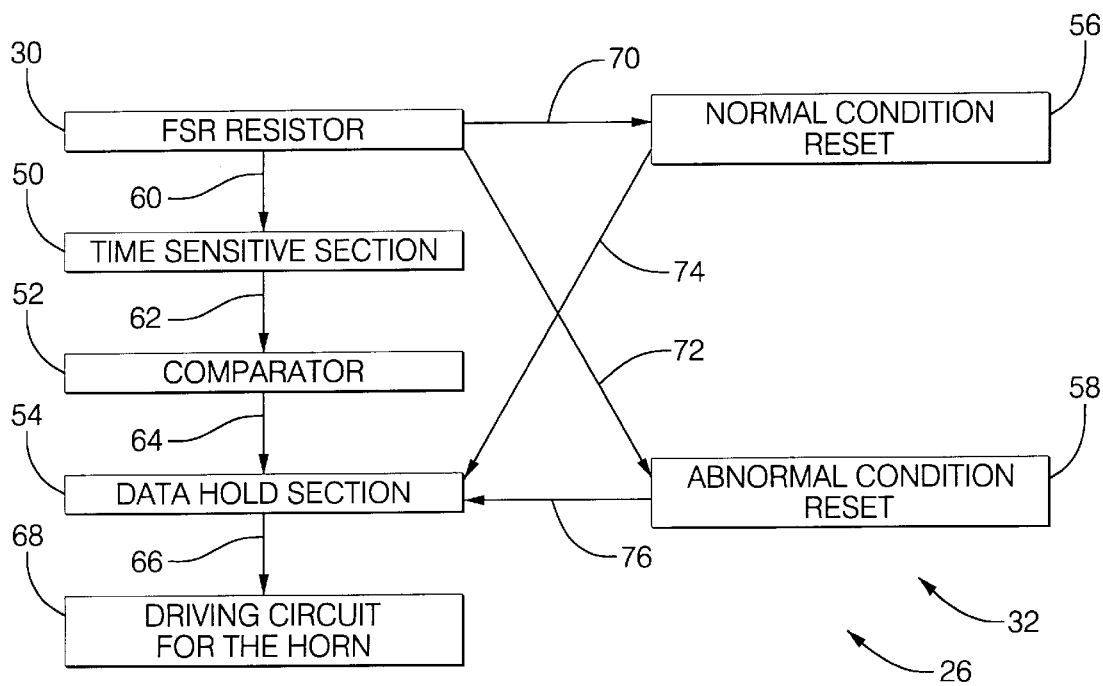
FIG. 2 is a functional block diagram of the horn switch assembly of FIG. 1.

Referring to FIG. 2, a block diagram of horn switch assembly 26 is shown. Load and rate sensing device 32 comprises a time sensitive section 50, a input data comparator 52, a data hold section 54, and normal and abnormal condition reset sections 56 and 58. Sensor 30 comprises a force sensitive resistor (FSR) mounted on the underside of an airbag cover (not shown). FSR 30 provides a pressure change voltage signal on a line 60 to time sensitive section 50 in response to changes in force applied to the airbag cover. The voltage level of the pressure change voltage signal is indicative of the magnitude of force applied to FSR 30. An output signal of time sensitive section 50 is supplied to input data comparator 52 by a line 62 in response to rapid changes in said pressure change voltage. An output signal of input data comparator 52 on a line 64 provides a clock for the data hold section 54 when said output signal of time sensitive section 50 indicates a rapid pressure change of sufficient magnitude on FSR 30. Data hold section 54 changes state and develops a horn activation signal on a line 66 whereby a driving circuit for the horn 68 is activated. Slow shrinkage of the airbag cover due to a temperature decrease or any factor that applies a slow pressure to the FSR 30 does not change the resistance of FSR 30 fast enough to trigger the output of time sensitive section 50. Also, the pressure change voltage signal must indicate a force of sufficient magnitude to trigger the output of input data comparator 52.

FSR 30 also provides the pressure change voltage signal to normal condition reset section 56 by a line 70. Normal condition reset section 56 provides a reset (clear) output signal, via line 72, in response to the complete release of force on FSR 30, thereby clearing data hold section 54 and causing data hold section 54 to output a horn de-activation signal to line 66. The de-activation signal de-activates driving circuit 68.

FSR 30 further provides the pressure change voltage signal to abnormal condition reset section 58 by a line 74. Abnormal condition reset section 58 develops a reset output signal on a line 76 in response to rapid drops in pressure on the FSR 30. The reset output signal of abnormal condition reset section 58 acts to clear data hold section 54 causing data hold section 54 to output a horn de-activation signal to line 66, thereby de-activating the horn. Thus, where shrinkage of the cover does not allow the complete release of force on FSR 30 and, therefore, does not allow normal condition reset section 56 to provide a reset signal, abnormal condition reset section 58 provides the reset signal to data hold section 54 for de-activating the horn.

Figure 3:
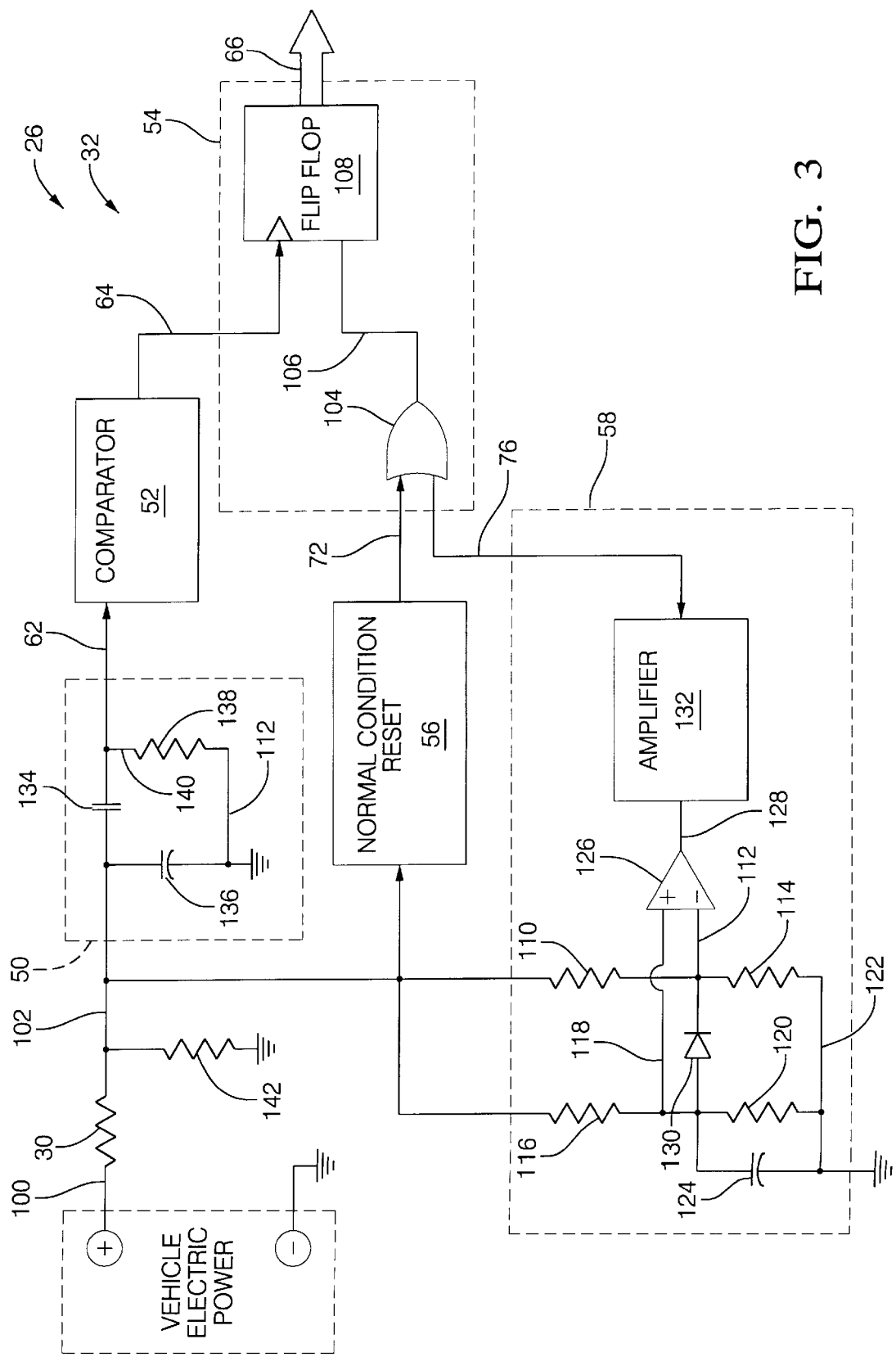
FIG. 3 is a circuit diagram of an exemplary embodiment of the horn switch assembly of FIGS. 1 and 2.

Referring to FIG. 3, a circuit diagram of an exemplary embodiment of the horn switch assembly 26 is shown. Vehicle power is provided to force sensitive resistor (FSR) 30 by a line 100. FSR 30 is mounted to an airbag cover, not shown, and changes resistance in response to changes in pressure applied to FSR 30 thereby developing a pressure change voltage signal on a line 102.

Under the normal condition where there is no force upon FSR 30 the pressure change voltage signal on line 102 is at a logic low level and is provided to a normal condition reset section 56. An output of normal condition reset section 56 on line 72 goes to a logic high level in response to the logic low level on line 102. Line 72 is connected to a first input of a logic OR gate 104, which forms part of data hold section 54, causing an output thereof to rise to a logic high on a line 106. A clear input of a flip flop 108, also forming part of data hold section 54, receives the output of logic OR gate 104 causing flip flop 108 to provide a de-activation signal to the horn drive circuit for turning off the horn. The data hold section 54 will not respond to incoming data as long as the reset is high. This protects the circuit from any random signal.

The pressure change voltage signal on line 102 is provided to abnormal condition reset section 58. Abnormal condition reset section 58 is a balanced bridge having one leg comprising a first resistor 110 series connected by a first midpoint line 112 to a second resistor 114 and having a second leg comprising a third resistor 116 series connected by a second midpoint line 118 to a fourth resistor 120. To guarantee the correct sequence, third resistor 116 should be higher than first resistor 110 in the range of 1.5K ohms to 4K ohms and fourth resistor 120 should be less than but approximately equal to second resistor 114. Said first leg connected in parallel with said second leg. First and third resistors 110 and 116 are connected to line 102. Second and fourth resistors 114 and 120 are connected to ground by a line 122. A first polarity capacitor 124 is connected in parallel with resistor 120 and causes voltage changes on second midpoint line 118 to lag a change on first midpoint line 112 as a result of changes in the voltage level on line 102. Midpoint lines 118 and 112 are connected, respectively, to a non-inverting and an inverting input of a comparator 126 such that an output of comparator 126 is developed on a line 128 when the voltage level on first midpoint line 112 is less than on second midpoint line 118. An anode of a diode 130 is connected to second midpoint line 118 and a cathode of diode 130 is connected to first midpoint line 112. Diode 130 allows for variations in component values in the first and second legs by assuring that a steady-state voltage on second midpoint line 118 cannot exceed that on first midpoint line 112 by more than a forward voltage drop of diode 130 which is insufficient to change output of comparator 126. Diode 130 also provides faster discharge of first polarity capacitor 124. Said output of comparator 126 is connected to an amplifier 132 by line 128. An output of amplifier 132 is the output of abnormal condition reset section 58 and is connected to a second input of logic OR gate 104 by line 76.

Said pressure change voltage signal on line 102 is also provided to a time sensitive section 50. Time sensitive section 50 provides an output signal on line 62 in response to rapid increases in voltage on input line 102. Input line 102 is connected to a second capacitor 134 and a third polarity capacitor 136. Second capacitor 134 is connected to a fifth resistor 138 by a line 140 and to an input of an input data comparator 52 by line 62. Fifth resistor 138 is connected to third polarity capacitor 136 by a line 142, which is connected to ground. A slow rise in said pressure change voltage signal on line 102 will not cause a change at the input of input data comparator 52 due to the low frequency blocking characteristics of capacitor 134. Conversely, a rapid rise in voltage (i.e., a rate of increase in the voltage signal greater than the threshold rate inherent in the circuitry) on line 102 will cause a positive pulse at the input of input data comparator 52. Input data comparator 52 compares the positive pulse at the input of input data comparator 52 to an internal threshold value and causes a positive pulse to a clock input on flip flop 108 via line 64 when the threshold value is exceeded. The positive pulse to the clock input on flip flop 108 causes a horn activation signal to be sent to the horn drive circuit, thereby activating the horn.

To operate the horn, the driver applies pressure to the airbag cover thereby deflecting said cover and applying a force to FSR 30, which decreases in resistance. The pressure change voltage signal on line 102 abruptly rises to a logic high level indicative of the force applied to the airbag cover, causing the output of normal condition reset section 56 to go low thereby driving the first input of logic OR gate 104 low. Capacitor 124 causes the voltage rise on second midpoint line 118 to lag the rise on first midpoint line 112 in response to the rapid increase in the pressure change voltage signal on line 102 thereby causing comparator 126 output to remain low. The output of abnormal condition reset 58 is connected to the second input of said logic OR gate 104 and is also low. Output of logic OR gate 104 is thereby driven low and no longer forces the flip flop 108 to output low. Time sensitive section 50 transfers a signal to input data comparator 52 in response to the abrupt increase in the pressure change voltage signal on line 102. Input data comparator 52 provides a pulse to said clock input of flip flop 108 causing the output of data hold section 54 to change state to a logic high, (a horn activation signal) which signals the horn drive circuit to sound the horn.

When the driver removes pressure from the airbag cover the FSR 30 resistance returns to a high value causing the pressure change voltage signal on line 102 to return to low. The output of normal condition reset section 56 returns high causing the output of logic OR gate 104 to return high and clear flip flop 108 to signal the horn driver circuit to turn off the horn.

In cold ambient temperatures the airbag cover shrinks resulting in a force on FSR 30. The increase of said force occurs slowly as the cover stiffens in the cold environment. The resistance of FSR 30 decreases gradually as the cover stiffens causing a gradual rise in the pressure change voltage signal on line 102. The force may increase to such a level that the pressure change voltage signal on line 102 will rise above a logic high level. However, the slow increase in the pressure change voltage signal on line 102 is blocked by second capacitor 134, thereby the clock input of flip flop 108 is not triggered and the horn does not sound. Third polarity capacitor 136 charges up to said pressure change voltage.

The pressure change voltage signal at a logic high voltage causes a low on the first input of logic OR gate 104 via normal condition reset section 56 and line 72. The increase in pressure change voltage signal on line 102 does not alter the relative values of first and second midpoint lines 112, 118. Therefore, the second input of logic OR gate 104 remains low, thereby causing the output of logic OR gate 104 to go low and not clear flip flop 108. However, since the pressure change voltage signal on line 102 will remain at a logic high voltage due to the shrinkage of the airbag cover or any problem that causes this pre-load, the output of normal condition reset section 56 on line 72 remains low and is not a control factor in clearing data hold section 54 and turning off the horn.

When the operator applies pressure to the airbag cover in the under that condition, the deflection causes a decrease in the resistance of the FSR 30. Third polarity capacitor 136 is charged to the high value of the pressure change voltage signal on line 102 due to the force on FSR 30 caused by shrinkage of the cover. Thus, the operator need not apply a great amount of force to overcome the stiffness of the airbag cover. An abrupt increase in force results in sounding of the horn by raising said pressure change voltage signal. Time sensitive section 50 transfers signal to the input data comparator 52 in response to the abrupt increase in the pressure change voltage signal on line 102. Input data comparator 52 provides a pulse to said clock input of flip flop 108 causing the output of data hold circuit 54 to change state to a logic high (a horn activation signal) which signals the horn drive circuit to sound the horn.

When the operator removes the additional pressure from the airbag cover, the resistance of FSR 30 increases causing a rapid decrease in the level of the pressure change voltage signal, back to the previous level resulting from the shrinkage of the airbag cover in the cold temperature. Since the pressure change voltage signal may still at a logic high, the normal condition reset section 56 may fail to clear the data hold section 54. However, the abrupt decrease in pressure change voltage signal on line 102 changes the voltages in abnormal condition reset section 58. First polarity capacitor 124 causes the voltage decrease on second midpoint line 118 of abnormal condition reset section 58 to lag the decrease on first midpoint on line 112 of abnormal condition reset section 58. The output of comparator 126 goes high, providing a high to the input of amplifier 132. The output of amplifier 132 goes high, whereby the second input (line 76) of logic OR gate 104 goes high, resulting in the output of logic OR gate 104 going high and providing a signal via line 120 to clear flip flop 108. Flip flop 108 provides a horn de-activation signal to the horn drive circuit to de-activate the horn.

A variable resistor 142 with third polarity capacitor 136 is provided on line 102 to allow a technician to adjust the pressure change voltage signal and, thereby, adjust the amount of force required to activate the horn.

Horn switch assembly 26 compensates for changes in the airbag module cover due to changes in temperature. This is achieved using a load and rate sensitive circuit 32 that detects only rapid changes in force on a force sensitive resistor 30 mounted on the inside cover of the airbag module. The use of additional sensors, such as temperature sensors, is unnecessary.

While a preferred embodiment has been shown and described, various modifications and substitutions may be made thereto without departing from the spirit and scope of the invention. Accordingly, it is to be understood that the present invention has been described by way of illustration and not limitation.

What is claimed is:
1. A horn switch assembly for an airbag module, said horn switch assembly comprising:
  a) a sensor arranged to sense a force applied to a steering wheel cover and generate a first signal indicative of a magnitude of said force; and
  b) a load and rate sensing device arranged to receive said first signal, and generate a horn activation signal when said magnitude exceeds a first threshold value and a rate of increase of said magnitude exceeds a second threshold value, said load and rate sensing device includes:
    i) a time sensitive section arranged to receive said first signal and generate a second signal when said rate of increase of magnitude exceeds said first threshold value, said second signal being indicative of said rate of increase of said magnitude, wherein said time sensitive section includes:
      first and second capacitors arranged to receive said first signal; and
    ii) a comparator section arranged to receive said second signal and generate a third signal when said magnitude exceeds said second threshold value, said first capacitor being electrically connected to said comparator section and said second capacitor being electrically connected to a ground; and a resistor having first and second leads, said first lead being electrically connected intermediate said second capacitor and said comparator section, and said second lead being electrically connected to ground.

2. The horn switch assembly of claim 1, wherein said sensor comprises a force sensing resistor.

3. A horn switch assembly as in claim 1, further comprising:
  a variable resistor coupled to said first signal provided by said sensor, said variable resistor being capable of varying the amount of force required to generate said horn activation signal.

4. A horn switch assembly for an airbag module, said horn switch assembly comprising:
  a) a sensor arranged to sense a force applied to a portion of a steering wheel cover and generate a first signal indicative of a magnitude of said force;
  b) a load and rate sensing device arranged to receive said first signal, and generate a horn activation signal when said magnitude exceeds a first threshold value and a rate of increase of said magnitude exceeds a second threshold value, said load and rate sensing device is further arranged to determine a rate of decrease of said magnitude and generate a horn de-activation signal when said rate of decrease exceeds a third threshold value, said load and rate sensing device is further arranged to generate a horn de-activation signal when said magnitude is less than a fourth threshold value; and
  said load and rate sensing device further includes:
    a time sensitive section arranged to receive said first signal and generate a second signal when said rate of increase of said magnitude exceeds said first threshold value, said second signal being indicative of said rate of increase of magnitude; a comparator section arranged to receive said second signal and generate a third signal when said rate of increase of magnitude exceeds said second threshold value;
    a normal condition reset section arranged to receive said first signal and provide a fourth signal when said rate of increase of magnitude is less than said fourth threshold value;
    an abnormal condition reset section arranged to receive said first signal and generate a fifth signal when said rate of decrease exceeds said third threshold value; and a data hold section arranged to receive said third, fourth and fifth signals, provide said horn activation signal when said third signal is received, and provide a horn de-activation signal when either of said fourth or said fifth signals are received.

5. The horn switch assembly of claim 4, wherein said abnormal condition reset section includes:

a balanced bridge having first and second legs connected in parallel, said first leg comprising:
  first resistor arranged to receive said first signal, and
  a second resistor connected between said first resistor and a ground; and said second leg comprising:
    a third resistor arranged to receive said first signal, and
    a fourth resistor connected between said second resistor and said ground;
  a first capacitor connected in parallel with said fourth resistor;
  a comparator having first and second inputs, said first input being connected intermediate said third and fourth resistors, and said second input being connected intermediate said first and second resistors; and
  a diode having an anode and a cathode, said anode being connected intermediate said third and fourth resistors, and said cathode being connected intermediate said first and second resistors.

6. An airbag module mounted on a steering wheel, said airbag module comprising:

a) an airbag disposed within said housing;
b) a cover having an outer surface and an inner surface, said cover being attached to said housing;
c) a sensor attached to said inner surface and arranged to sense a force applied to said outer surface, said sensor for generating a first signal indicative of a magnitude of said force; and
d) a load and rate sensing device including:
  i) a time sensitive section arranged to receive said first signal and generate a second signal when a rate of increase of said magnitude exceeds a first threshold value, said second signal being indicative of said rate of increase of said magnitude;
  ii) a comparator section arranged to receive said second signal and generate a third signal when said magnitude exceeds a second threshold value;
  iii) an abnormal condition reset section arranged to receive said first signal and generate a fourth signal when a rate of decrease of said magnitude exceeds a third threshold value;
  iv) a normal condition reset section arranged to receive said first signal and provide a fifth signal when said magnitude is less than a fourth threshold value; and
  v) a data hold section arranged to receive said third, fourth and fifth signals, provide said horn activation signal when said third signal is received, and provide a horn de-activation signal when either of said fourth or said fifth signals are received.

7. A horn switch assembly, comprising:

a) a sensor for generating a first signal indicative of a magnitude of force; and
b) a load and rate sensing device including:
  i) a time sensitive section arranged to receive said first signal and generate a second signal when a rate of increase of said magnitude exceeds a first threshold value, said second signal being indicative of said rate of increase of said magnitude;
  ii) a comparator section arranged to receive said second signal and generate a third signal when said magnitude exceeds a second threshold value;
  iii) an abnormal condition reset section arranged to receive said first signal and generate a fourth signal when a rate of decrease of said magnitude exceeds a third threshold value;
  iv) a normal condition reset section arranged to receive said first signal and provide a fifth signal when said magnitude is less than a fourth threshold value; and
  v) a data hold section arranged to receive said third, fourth and fifth signals, provide a horn activation signal when said third signal is received, and provide a horn de-activation signal when either of said fourth or said fifth signals are received.

8. The horn switch assembly as in claim 7, wherein said sensor comprises a force sensing resistor.

* * * * *